Dec. 12, 1961    J. A. WOOLDRIDGE ETAL    3,012,569
LIQUID PIPELINE SECTIONS
Original Filed Oct. 14, 1958
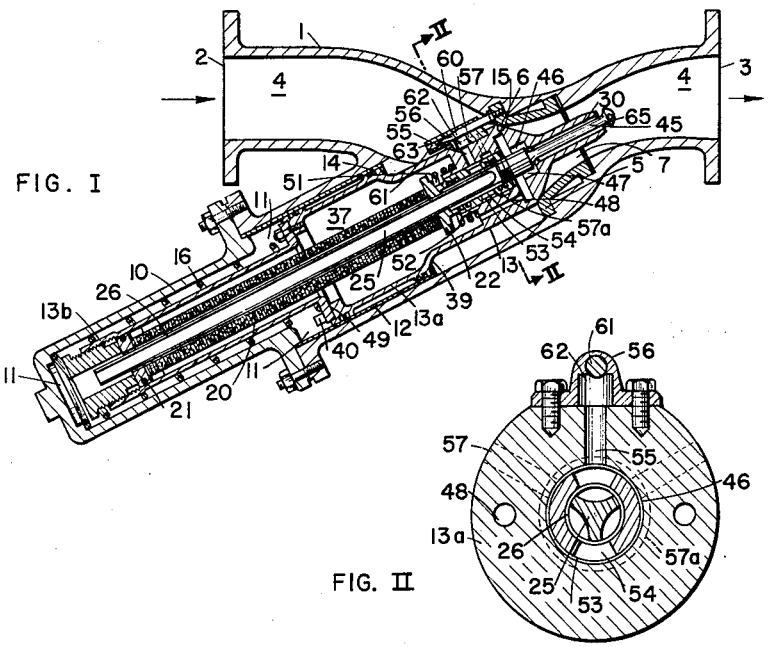
FIG. I
FIG. II
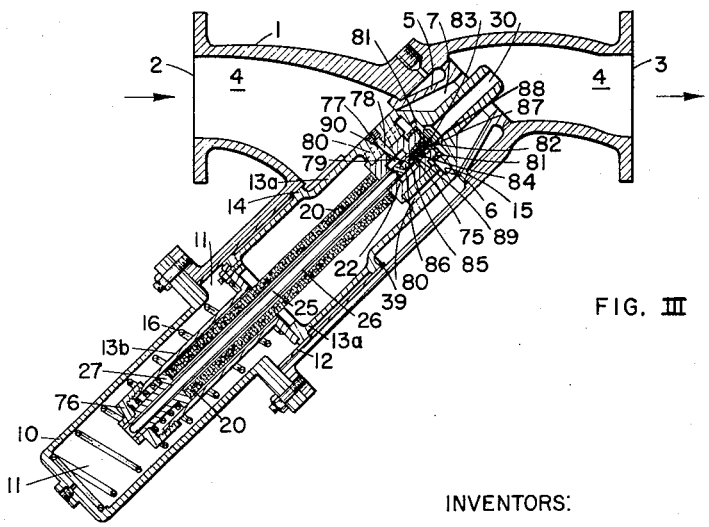
FIG. III
INVENTORS:
JAMES A. WOOLDRIDGE
ERNEST F. WINTER.
BY: H D Birch
THEIR ATTORNEY

3,012,569
LIQUID PIPELINE SECTIONS

James A. Wooldridge, Betchworth, and Ernest F. Winter, Upton by Chester, England, assignors to Shell Oil Company, a corporation of Delaware
Original application Oct. 14, 1958, Ser. No. 767,214. Divided and this application June 12, 1959, Ser. No. 825,625
Claims priority, application Great Britain June 13, 1958
6 Claims. (Cl. 137—172)

The present invention relates to liquid pipeline sections, and while it is generally applicable to pipeline sections for use in systems for the transfer of liquids which are immiscible or substantially immiscible with water, it is particularly applicable to pipelines which are used for the transfer of hydrocarbon fuels from one reservoir to another, for example, for the transfer of aviation fuel from a refueling tanker or a hydrant refueling system to the storage tanks of an aircraft. References to liquids in this specification are to be understood to be confined to those liquids which are immiscible or substantially immiscible with water. This application is a division of application Serial No. 767,214, filed October 14, 1958.

Particularly in cases such as the example quoted in which a hydrocarbon oil, such as aviation kerosene, is being delivered to a tank, in say an aircraft, from which it will eventually be drawn for use as a fuel, it may be important that the oil being delivered should not contain free water. However, contamination with water can and occasionally does occur at some stage before delivery to the tank and while certain procedures may be laid down for detecting the presence of water in the oil in the storage tank from which it is transferred, and for preventing its transference to the tank receiving the oil, an automatic mechanical safeguard to stop the flow of oil as soon as it is found to contain water, is preferred.

Pipe sections including such a safeguard are described in U.S. Patent No. 2,842,152, issued July 8, 1958, use being made of certain filter packs which consist in a mass of filter material, for example, impregnated filter paper, which mass will permit the passage of liquid other than water through it, but absorbs water carried in the liquid stream, and is so arranged that on so doing it swells sufficiently to produce a mechanical movement sufficient for the operation of a suitable form of valve. Alternatively, the pack may be constrained so that change of its external dimensions on absorbing water is wholly or partially prevented, the swelling on contact with water then resulting in a closing up of the fluid flow passages through the pack and an increase of the pressure drop across it which may be caused to actuate some suitable mechanism. With some filter materials in fact the second effect is the more prominent, the absorption of water giving rise to only slight increase of dimensions but to a considerably increased resistance to flow. All such filter packs will be referred to in this specification as "filter packs of the kind specified." One form of filter pack of the kind specified consists of a pile or pack of annular filter papers compressed between end plates and mounted on a rod passing through the center channel of the pack. In operation, liquid flows through the pack either from outside the external cylindrical surface to the center channel within, or in the reverse direction, the general direction of the flow thus being parallel to the planes of the filter papers and not through them in the conventional manner.

It is an object of the present invention to provide pipelines and pipeline sections which include such an automatic safeguard against the passage of free water through them and are comparatively compact and also sensitive, that is to say quick in responding to the advent of small quantities of water.

According to the present invention a liquid pipeline section is provided with a valve seat encircling the liquid passage through the section, a valve member in the form of a sleeve having an external surface adapted to fit against the valve seat and block the liquid passage through it, which sleeve projects into the section from a closed branch in which it is mounted so as to be able to slide towards and away from the valve seat while maintaining a liquid-tight seal between its external surface and the interior surface of the branch, biasing means urging the sleeve towards the valve seat, and a filter pack of the kind specified mounted within the cavity formed within the sleeve, said cavity being sealed from the liquid passage through the section in all operational positions of the sleeve apart from one or more restricted inlet orifices communicating with said liquid passage to that side of the valve seat which in normal operation lies upstream from it, and giving access within the cavity to the inlet to the filter pack, the outlet of the filter pack communicating with said liquid passage on the other side of the valve seat through one or more outlet passages of considerably less resistance to flow than the inlet orifices, the sleeve being provided with an external surface or surfaces which is or are exposed in operation to the liquid pressure on said upstream side of the valve seat and the area and orientation of which are such that, when flow is proceeding normally through the pack, the pressure drop across the inlet orifices to the sleeve is sufficient to enable the excess external liquid pressure acting on said surface to force the sleeve away from the valve seat in opposition to the biasing means, and the filter pack being arranged so that on contact with free water it causes blockage of flow through the sleeve under which condition the sleeve is forced back against the valve seat owing to the reduced pressure around its downstream end during full flow through the section.

Where the two ends of the pipeline section are required to be in line, or approximately so, the sleeve preferably projects into the section at an acute angle to the normal direction of flow through the section, and preferably at an angle lying between 20° and 60°, in order to minimize the total pressure drop through the section when full flow is taking place. However, the sleeve and the branch may be wholly within a part of the pipeline section which is of greater cross section than the remainder.

Normally the sleeve will be of generally cylindrical shape, being provided towards the end which projects into the fluid passage through the section, with a tapering shoulder, the surface of which is adapted to fit into a circular bevelled valve seat mounted on or formed integrally with the wall of the liquid passage. The said end may be provided with a nose-piece through which the outlet passages from the filter pack pass and which projects some distance through and beyond the valve seat.

In addition the sleeve will usually fit closely within the closed branch, in the manner of piston in a cylinder, circumferential liquid seals such as O-ring seals, labyrinth seals or the like being provided to afford a liquid-tight seal around the sleeve.

The sleeve may be provided with an external surface on which excess external liquid pressure acts to force the sleeve away from the valve seat, in the form of a shoulder on its external surface directed towards the valve seat, the shoulder lying between the surface adapted to fit against the valve seat and such sealing means as is provided between the external surface of the sleeve and the interior surface of the branch.

The biasing means will usually be a spring or springs mounted to urge the sleeve towards the valve seat. In particular, it may be a single helical spring compressed between the closed end of the branch and the nearer end of the sleeve, or a suitable projection on the external surface of the sleeve at an intermediate point along its length.

The filter pack may be maintained under sufficient longitudinal compression by one or more springs acting on one or both of the end plates of the pack. Blockage of flow through the sleeve may be effected by a simple valve mechanism arranged to close the outlet passage or passages on expansion of the pack after contact with free water, or on increase of the pressure drop across it. Alternatively, the blockage may be caused simply by the pack itself, it being constrained between end plates and the swelling on contact with water being sufficient to cut-off flow.

Where the filter pack is a pack of annular filter papers compressed between end plates and mounted on a rod passing through the interior channel of the pack, the inlet orifices of the sleeve may lead to the space outside the pack, the interior channel communicating with the outlet passages. However, to increase the sensitivity of the arrangement, i.e. to decrease the time taken to respond to the arrival of contaminated liquid in the pipeline section, it is preferred that the inlet orifices shall communicate with the interior channel of the pack, and the outlet passages with the space outside it.

The outlet passages must be such that under all conditions of flow the pressure drop across them is small compared with that through the inlet orifices, the latter being such that the pressure drop across them when there is normal flow through the pack, is sufficient to enable the excess external pressure acting on the surface or surfaces of the sleeve to force the latter away from the valve seat against the action of the biasing means.

In cases where the swelling of the material of the pack does not or is not allowed to give rise to expansion, the increased resistance to flow through the pack is arranged to be such that the liquid pressure inside the sleeve rises to a value such that excess external liquid pressure acting on said surface is insufficient to hold the sleeve away from the valve seat. In one particular arrangement, there may be provided a pilot valve arranged to be actuated on the occurrence of a small increase in the pressure drop across the pack to close the outlet passage or passages therefrom. This last arrangement may conveniently be one in which the inlet orifices communicate with the interior channel of the pack.

It will be appreciated that liquid pipeline sections according to the present invention may form part of some liquid flow system, for example an aircraft refueling system, the section being permanently, or at least semi-permanently, incorporated in the system. Thus the present invention also provides a liquid flow system or a liquid pipeline including a liquid pipeline section according to the present invention, said section being provided as part of a lquid flow channel or of the pipeline to stop the flow of liquid through it substantially immediately upon contact of free water-containing liquid with the pack in the section. Such a section may in particular be included in a system which also includes a filter pack of the kind specified as a filter element for removing suspended matter from the liquid, the section according to the present invention being incorporated in the system upstream of the filter element and protecting it in operation from all but very small quantities of water. The pack in a section according to this invention may be a relatively small one, and can thus afford protection for a much larger and more expensive pack which would otherwise have to be replaced on each occasion that the liquid it is used to filter contains free water.

For example, one or more liquid pipeline sections according to the present invention may be included in a mobile aircraft refueller including, for example, one or more fuel storage tanks together with appropriate pumps, valves, meters and connections for the delivery of measured quantities of fuel to one or more outlet connections. Such sections may also be included in the refueling trolleys used for connecting aircraft fuel tanks with the hydrants of a static fueling system.

While the pipeline sections have been developed in particular for use in preventing the delivery of water-contaminated fuel to aircraft, it will be appreciated that they may equally be incorporated in any other liquid flow system in which it is desired to prevent liquid contaminated by free water passing to a given point in the system.

In the accompanying drawing,

FIG. I is a longitudinal section of a pipeline section.

FIG. II is a cross section along the line II—II of FIG. I.

FIG. III is a longitudinal section of a further pipeline section.

Reference is first made to FIG. I of the drawing. The liquid pipeline section has a main casing 1 provided at its ends 2 and 3 with flanges to enable it to be bolted to other sections of pipeline or other allied equipment in the usual manner. It will, of course, be appreciated that any other form of coupling means may be provided if required. The two ends 2 and 3 of the section are joined by a main liquid passage 4 and the whole is designed for flow to take place in the direction of the arrows from the end 2 to the end 3. Any references in this description to directions of flow, and the use of terms such as upstream, downstream, inlet and outlet are to be understood to refer to this designed direction of flow through the section.

Fitted into the wall of the passage 4 is a ring 5, providing a beveled valve seat 6, directed towards the inlet end 2 of the section, the ring 5 also forming a Venturi-like constriction 7 in the passage 4 downstream of the valve seat 6.

The main casing 1 together with a cap 10, bolted to it so as to form a liquid-tight joint, form a closed branch 11 joining the main passage 4 at an acute angle. Fitting closely into the wider first part of the branch 11, the wall of which is lined with a steel or a polytetrafluorethylene cylindrical liner 12, is a sleeve 13 constructed in two parts 13a and 13b bolted together. The part 13a is provided with circumferential labyrinth type seals 14 bearing on the liner 12 so as to render insignificant any leakage of liquid from the passage 4 into the parts of the branch 11 lying behind the seals 14. The front end of the sleeve part 13a is provided with a tapering shoulder 15 of such a shape as to fit against the valve seat 6, when in the closed position shown in FIG. I, and block the passage 4. A helical spring 16 compressed between the closed end of the branch 11 and the end flange of the sleeve part 13b urges the sleeve 13 towards the valve seat 6. The spring 16 could alternatively act against the nearer end of the part 13b or any other suitably directed surface on it or any attachments to it.

The sleeve 13 contains a filter pack of the kind specified comprising a pack 20 of annular filter papers (indicated only diagrammatically in the drawing) which will swell on contact with only small amounts of free water, to produce a longitudinal expansion of the pack 20.

The nose of the sleeve 13 projects through and beyond the valve seat 6 and contains a liquid flow channel 30 which is the outlet passage from the interior of the sleeve, being continuous with the interior channel 26 of the pack 20 and opening into the main channel 4 downstream of the valve seat and the constriction 7.

The liquid entering the sleeve 13 passes straight into the interior of the pack 20, flows outwards through the pack 20, then through the space 37 and out through the channel 30 into the main passage 4. This arrangement is made to increase the sensitivity of the arrangement, that is to say its speed of reaction to the advent of a small quantity of water, on the basis that the volume of the space inside the pack 20 is much less than that of the exterior space 37, and that therefore the first contaminated liquid has less uncontaminated liquid with which to mix before it passes into the pack 20. In addition, the surface area presented by the pack 20 is smaller on the inside than the outside. There are also other refinements aimed at improving the operation of the arrangement in various ways.

As a result of this modification, the arrangement of the pack 20 within the sleeve 13 is naturally somewhat different. At the outlet end, the channel 30, down the center of which an extension piece 45 of the rod 25 passes, opens into a wider cylindrical bore 46 in the sleeve part 13a and communicates with the space 37 outside the pack 20 through an annular channel 47 and two longitudinal channels 48 (one of which appears only in FIG. I). In normal operation this is the only outlet from the space 37 to the exterior of the sleeve 13, and to ensure fluid-tightness a gasket seal 49 is clamped between the flanges of the two sleeve parts 13a and 13b. The circumference of the end plate 21 is such that it is a good slide fit in the sleeve part 13b while the end cap of the part 13b is removable, being screwed into position and supporting the end plate 21.

The end plate 22 is not fixed but is integral with a sleeve 50 which slides in the bore 46 in the sleeve part 13a, a spring 51 being compressed between the plate 22 and the sleeve part 13a to maintain the pack 20 under compression. The sleeve 50 is provided with a labyrinth type seal 52 to prevent any significant leakage of fluid into the space 37, and at its end remote from the plate 22 is screwed to the end of the pack rod 25. At an intermediate point along its length an annular groove 53 communicates through two holes 54 with the interior channel 26 of the pack 20, and lies opposite the inner end of a hole 55 passing through the wall of the sleeve part 13a and communicating with the exterior of the sleeve 13 on the upstream side of the valve seat 6 through a needle valve 56 described in more detail below. In addition when the sleeve 50 has moved slightly to the right (this direction referring to the section as shown in FIG. I) in operation, the groove 53 comes opposite a similar groove 57a in the wall of the bore 46 which groove 57a communicates with the inner ends of two holes 57 (see FIG. II) passing through the sleeve part 13a and communicating directly with the outside of the sleeve 13.

The needle valve 56 is mounted on the outside of the sleeve part 13a apart from the needle 60 itself which is screwed into the flange of the member 5. The valve has a longitudinal passage 61 communicating through a small chamber 62 with the hole 55, the needle 60 controlling the size of an orifice 63 through which the liquid has to flow from the passage 61 to the chamber 62, from a minimum small value when the sleeve 13 is against the valve seat 6 up to a maximum value when the sleeve 13 is withdrawn from the valve seat 6 by the full amount possible. It will be appreciated that other equivalent valve arrangements may be employed instead of this needle valve 56.

Finally the outer end of the extension piece 45 is provided with a cap 65, capable, if the piece 45 is drawn far enough back into the channel 30, of blocking the end of the channel 30, while the inner end of the channel 30 is provided with a valve seat 66 arranged to co-act with a conical part 67 of the extension piece 45, to block the channel 30 at that end. It will be noted that the movement of the rod 25 which causes the part 67 to seat on the valve seat 66, is in the same direction as the flow of liquid, and as a result the fluid pressure upstream of this valve arrangement is acting to assist in its closure. In the arrangement shown in FIG. I, this fluid pressure is acting against the valve action.

The flow through the pack 20 under normal conditions with no water present takes place through the needle valve 56 (i.e. via passage 61 and chamber 62) through the hole 55, groove 53 and holes 54 into the internal channel 26 of the pack 20. Then, it passes out into the main passage 4 through the pack 20, space 37, the channels 48, the annular channel 47 and the channel 30. The needle valve 56 is adjusted so that when the sleeve 13 lies against the valve seat 6 the flow is very restricted, thus providing an increased pressure drop between the inside and outside of the sleeve 13 and thus increasing the force available to counteract the biasing spring 16. As the sleeve 13 moves back into the branch 11, the orifice 63 increases in size in such a way that the flow through pack 20 is roughly proportional to the total flow, thus making the arrangement roughly equally sensitive at all flow rates. The initial increased force on the sleeve 13 gives a more positive opening action.

If the pack 20 swells due to the receipt of free water, the sleeve 50 will be forced into the bore 46 against the action of the spring 51, until the inner end of the channel 30 is closed by seating of the part 67 on the valve seat 66. The inwards movement of the end plate 22 also causes overlap of the groove 53 in the sleeve 50 with the groove 57a in the wall of the bore 46. The passages 57 then allow extra flow between the exterior of the sleeve 13 and the interior, thus further reducing the pressure difference between the inside and the outside of the sleeve 13 and accelerating the motion of the sleeve 13 towards the valve seat 6.

In the event of there being no pack 25 in position, the spring 51 will pull the cap 65 down to close the outer end of the channel 30 and thus prevent the main passage 4 from being opened. It can also be used to judge that the part 67 is correctly spaced from the valve seat 66, by means of a gauge inserted between it and the end surface of the sleeve part 13a. This spacing can be adjusted by screwing the end cap of the sleeve part 13b in or out as required, thus changing the position of the end plate 21 of the pack 20 and with it the spacing of part 67 from the valve seat 66.

While the provision of the needle valve 56 and the passages 57 are both desirable refinements, it will be appreciated that both or either may be omitted if desired for simplicity.

The embodiments of the present invention previously described incorporates packs in which the swelling on absorption of free water gives rise to appreciable longitudinal expansion, the movement thus occurring being utilized to actuate the valve closing mechanism. It is, however, possible to employ packs which are constrained so that no or only a slight expansion is possible, the swelling that takes place in the material of the pack then leading to an increased resistance to flow. In some materials, in fact, this effect is much more pronounced than the expansion.

Referring now to FIG. III of the drawings, which shows another embodiment, the pack 20 is held between end plates 21 and 22, the latter being provided with an internal screw thread 75 into which a corresponding thread on the end of the rod 25 is screwed. At the other end of the pack 20, the end plate 21 is a slide fit within the sleeve part 13b and is held in position by a cap nut 76 fitting over and screwed on to the end of the sleeve part 13b. The nut 76 bears against a shoulder on the end plate 21 and adjustment of its position allows slight adjustment of the compression of the pack 20.

The general flow arrangements are similar to those of the embodiment shown in FIG. I, that is from inside the pack 20 to the outside, in order to provide for greater sensitivity. The inlet from the main channel 4 is through a small orifice 77 into a radial channel 78 leading through the wall of the sleeve part 13a and the end plate 22 to an annular channel 79 surrounding the pack rod 25. At its left hand end (as shown in FIG. III) the channel 79 communicates with interior channel of the pack 26, from whence, in normal operation, the flow passes out through the pack 20, and through three channels 80 (only two appear in FIG. III) passing longitudinally through the wall of the sleeve part 13a to an outlet space 81 normally in communication with the outlet channel 30.

A sensitive pilot valve mechanism is provided which responds to only a very small rise in the pressure drop across the pack 20 to stop the flow through the pack 20 instantaneously, thus causing rapid cessation of the flow through the main channel 4 in the normal way, the sleeve 13 being forced against the valve seat 6 so that the latter is engaged by the shoulder 15. This mechanism comprises a valve member 82, the spindle 83 of which is screwed into a bore 84 in the end of the shaft of a piston 85 arranged to slide in a cylindrical cavity 86 formed in the end of the pack rod 25. The valve member 82 has a frusto-conical surface adapted to seat on a similarly shaped valve seat 87 around the inner end of the outlet channel 30. It could alternatively merely be a good slide fit in the entrance to channel 30, this causing a sufficiently good stoppage of flow through the pack 20. A retaining cap 88 for the piston 85 is screwed on to the end of the end plate 22 and a small spring 89 is compressed between the cap 88 and the piston 85, so as normally to hold the valve member 82 away from the seat 87 and permit flow of liquid from the outlet space 81 to the channel 30. A narrow channel 90 joins the part of the cavity 86 behind the piston 85 to the annular space 79 through which liquid flows on its way into the interior channel 26 of the pack 20. Provided there is only the normal pressure drop across the pack 20, the spring 89 holds the pilot valve open. Its strength is such, however, that as soon as there is only a slight increase in resistance of the pack 20 and therefore increase of pressure in the space 86, the consequent difference in pressure at the two ends of the moving system consisting of the piston 85 and the valve member 82 is sufficient to overcome the action of the spring 89 and the pilot valve is closed. This cuts off the flow through the pack 20, giving equalization of the liquid pressures inside the sleeve 13 and in the main channel 4 upstream of the valve seat 6, which, as described in the previous examples, results in the sleeve 13 being drawn home so that the shoulder 15 seats against the valve seat 6 cutting off the main flow.

In order to ensure that flow through the section is impossible in the absence of a pack 20, spring loaded valves may be provided which close the entrance of the channels 80 in the absence of pack 20, but remain open as long as a pack is in position. It will be appreciated too that in all cases cessation of flow through the pack leads to cut-off of the main flow, whatever the cause. This is a "fail-safe" safeguard which is highly desirable in aircraft refueling systems and means, for example, that blockage of the filter pack 20 by dirt and impurities such as to render it ineffective will result in cut-off of the flow even though no water is present. Thus operation cannot continue with a pack rendered ineffective in this manner.

We claim as our invention:

1. A pipeline section for liquid hydrocarbon flow comprising: a main section, a closed end branch section joining said main section, a main valve seat encircling the liquid passageway through the main section, a hollow piston-shaped valve member having an external shoulder closely and slidably fitted against the interior wall of said branch section and seating at one end portion upon said main valve seat, a spring mounted in said branch section urging the piston-shaped valve member towards said main valve seat, an axially mounted filter pack means on the inside of said hollow piston-shaped valve member, said filter pack means comprising an annular water sensitive filter element held between end plates, a restricted orifice means through the wall of said piston-shaped valve member forming the sole passageway between the outside of said piston-shaped valve member and an axial passageway in the center of said filter element, said restricted orifice means leading directly to the passageway in the center of said filter element, flow control means co-operating with one of the end plates of the filter element which blocks flow from the space between the exterior of the filter and the interior of the piston to the outlet when water is sensed by the filter element, and unblocks flow when water is not sensed by the filter, outlet means from the annular space between the inside wall of the hollow piston-shaped valve member and the exterior of said filter element and an axial outlet in said piston-shaped valve member discharging at one end downstream into said main section in the area of said main valve seat and communicating with said filter outlet means at its other end.

2. A pipeline section according to claim 1 in which the orifice means comprises a needle valve cooperating with a fixed orifice, said elements being relatively movable one to the other and so arranged that the effective orifice size is reduced as the piston-shaped valve member moves towards said main valve seat.

3. A pipeline section according to claim 1 in which the main valve seat, the piston-shaped valve member and the closed ended branch section are at an angle of between 20° to 60° to the line of flow of liquid in the main section.

4. A pipeline section according to claim 1 in which the end portion of said piston-shaped valve member seating on said main valve seat is tapered and together with the main valve seat forms a venturi in the valve open position and arranged to increase the rate of flow of liquid through said axial outlet in said piston-shaped valve member.

5. A pipeline section according to claim 1 in which said flow control means includes a valve mechanism arranged so that when the filter element expands said valve mechanism blocks flow through the axial outlet in said piston-shaped valve member.

6. A pipeline section according to claim 1 in which said filter pack means includes a valve mechanism arranged so that when the filter element is absent, said valve mechanism blocks flow through the axial outlet in said piston-shaped valve member.

References Cited in the file of this patent
UNITED STATES PATENTS

| | | |
|---|---|---|
| 1,046,236 | Wagner | Dec. 3, 1912 |
| 1,848,031 | Spencer | Mar. 1, 1932 |
| 2,842,152 | Winter | July 8, 1958 |